(12) United States Patent
Pease et al.

(10) Patent No.: US 11,397,793 B2
(45) Date of Patent: Jul. 26, 2022

(54) DELIVERING DIGITAL CONTENT FOR AN APPLICATION

(71) Applicant: Microsoft Technology Licensing, LLC, Redmond, WA (US)

(72) Inventors: Geoffrey Edward Pease, Bothell, WA (US); Daniel Christopher Rodgers, Duvall, WA (US); Jesse Daniel Kaplan, Sammamish, WA (US); Madhusri Nayak, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 254 days.

(21) Appl. No.: 16/702,250

(22) Filed: Dec. 3, 2019

(65) Prior Publication Data

US 2021/0165857 A1    Jun. 3, 2021

(51) Int. Cl.
*G06F 21/10* (2013.01)
*A63F 13/73* (2014.01)
*A63F 13/792* (2014.01)

(52) U.S. Cl.
CPC ............ *G06F 21/105* (2013.01); *A63F 13/73* (2014.09); *A63F 13/792* (2014.09);
(Continued)

(58) Field of Classification Search
CPC ........... G06F 21/105; G06F 2221/0771; G06F 2221/0773; G06F 2221/0791; A63F 13/73; A63F 13/792; A63F 2300/5513; G06Q 20/127; G06Q 30/04; G06Q 2220/18; G06Q 20/1235; G06Q 30/0645
See application file for complete search history.

(56) References Cited

U.S. PATENT DOCUMENTS 7,631,323 B1 * 12/2009 Green ............... G06Q 30/0633
235/383
8,533,076 B2    9/2013 Chu
(Continued)

OTHER PUBLICATIONS

"International Search Report and Written Opinion Issued in PCT Application No. PCT/US20/059914", dated Feb. 17, 2021, 12 Pages.
(Continued)

*Primary Examiner* — David Garcia Cervetti
(74) *Attorney, Agent, or Firm* — Ray Quinney & Nebeker; Tiffany Healy

(57) ABSTRACT

The present disclosure relates to systems, methods, and computer-readable media for providing digital content for an application to users. For example, systems described herein can provide a license for the digital content during a rental time. Systems disclosed herein may additionally track a duration of use of an application and compare the tracked use against an amount of rental time purchased (e.g., rented) by a user. The systems described herein may further extend a license or terminate the license based on a determination of whether the amount of use exceeds a rental time. Features and functionality described herein provide a flexible and efficient mechanism that enables users having a variety of content-consuming preferences to receive affordable content while ensuring that use of an application is efficiently and accurately tracked.

20 Claims, 7 Drawing Sheets

(52) U.S. Cl.
CPC .............. *A63F 2300/5513* (2013.01); *G06F 2221/0771* (2013.01); *G06F 2221/0773* (2013.01); *G06F 2221/0791* (2013.01)

(56) References Cited

U.S. PATENT DOCUMENTS

| | | | | |
|---|---|---|---|---|
| 8,584,165 | B1* | 11/2013 | Kane | H04N 21/2225 725/38 |
| 8,677,430 | B2* | 3/2014 | Mitsuji | H04N 21/8355 705/906 |
| 9,935,956 | B1* | 4/2018 | Cha | H04L 63/10 |
| 10,560,581 | B1* | 2/2020 | Shah | H04W 8/20 |
| 2002/0022971 | A1 | 2/2002 | Tanaka et al. | |
| 2002/0049679 | A1* | 4/2002 | Russell | H04L 63/0428 705/52 |
| 2003/0028454 | A1* | 2/2003 | Ooho | G06Q 10/0631 705/32 |
| 2005/0044016 | A1* | 2/2005 | Irwin | G06Q 20/3672 705/30 |
| 2005/0119976 | A1* | 6/2005 | Taylor | G06Q 30/06 705/52 |
| 2006/0021061 | A1 | 1/2006 | Cerri et al. | |
| 2006/0095286 | A1* | 5/2006 | Kimura | G06Q 10/02 707/E17.108 |
| 2006/0106726 | A1* | 5/2006 | Raley | G06F 21/10 705/59 |
| 2006/0107046 | A1* | 5/2006 | Raley | G06Q 50/184 713/168 |
| 2006/0117314 | A1 | 6/2006 | Sato | |
| 2006/0143134 | A1* | 6/2006 | So | G06F 21/10 705/59 |
| 2007/0243928 | A1* | 10/2007 | Iddings | G07F 17/3223 463/26 |
| 2007/0265966 | A1* | 11/2007 | Kahn | H04N 7/162 348/E7.06 |
| 2007/0265967 | A1* | 11/2007 | Kahn | H04N 21/4627 348/E7.06 |
| 2007/0265968 | A1* | 11/2007 | Kahn | G06Q 20/382 705/51 |
| 2007/0265970 | A1* | 11/2007 | Kahn | H04N 21/63345 348/E7.071 |
| 2007/0265973 | A1* | 11/2007 | Kahn | G06F 21/10 705/57 |
| 2007/0265978 | A1* | 11/2007 | Kahn | G06Q 50/184 705/59 |
| 2007/0266414 | A1* | 11/2007 | Kahn | H04N 7/162 348/E7.071 |
| 2008/0215468 | A1* | 9/2008 | Monsa-Chermon | G06Q 30/04 705/400 |
| 2008/0235805 | A1* | 9/2008 | Pfitzmann | G06F 21/105 726/27 |
| 2008/0270319 | A1* | 10/2008 | Torabi | G06Q 30/06 705/36 R |
| 2009/0055252 | A1* | 2/2009 | Samuel | G06Q 30/02 705/14.61 |
| 2009/0055321 | A1* | 2/2009 | Samuel | G06Q 30/02 705/14.61 |
| 2009/0055933 | A1* | 2/2009 | Samuel | G06Q 30/02 705/1.1 |
| 2009/0055937 | A1* | 2/2009 | Samuel | G06F 21/10 726/28 |
| 2009/0055938 | A1* | 2/2009 | Samuel | G06F 21/10 726/30 |
| 2009/0119218 | A1* | 5/2009 | Ooki | G06Q 50/184 705/59 |
| 2010/0024000 | A1* | 1/2010 | Holtzman | G06F 21/10 726/2 |
| 2010/0071072 | A1* | 3/2010 | Holland | G06Q 10/08 340/5.74 |
| 2010/0186092 | A1* | 7/2010 | Takechi | H04N 7/17318 726/26 |
| 2011/0047041 | A1* | 2/2011 | Kemery | G06Q 30/0607 705/26.25 |
| 2011/0113122 | A1* | 5/2011 | Drope | H04L 63/061 709/219 |
| 2012/0011069 | A1* | 1/2012 | Kazawa | G06F 21/10 705/59 |
| 2012/0275758 | A1* | 11/2012 | Tsuji | H04N 21/4325 386/230 |
| 2012/0278904 | A1* | 11/2012 | Perez | G06F 21/10 726/31 |
| 2013/0254001 | A1 | 9/2013 | Acar et al. | |
| 2014/0173037 | A1* | 6/2014 | Beddow | H04L 67/06 709/219 |
| 2014/0380499 | A1* | 12/2014 | Pruss | G06F 21/105 726/27 |
| 2015/0039516 | A1* | 2/2015 | Kushalnagar | G06Q 20/1235 705/59 |
| 2015/0074818 | A1* | 3/2015 | Watson | H04N 21/84 726/27 |
| 2016/0065717 | A1* | 3/2016 | Ilmonen | H04W 4/60 455/410 |
| 2016/0071199 | A1* | 3/2016 | Teksler | G06Q 30/0645 705/307 |
| 2016/0125421 | A1* | 5/2016 | Levin | G06Q 30/018 705/317 |
| 2017/0017977 | A1 | 1/2017 | Herriger et al. | |
| 2017/0024548 | A1* | 1/2017 | Dorwin | G06F 16/7867 |
| 2017/0352115 | A1* | 12/2017 | Trevathan | G06Q 50/184 |
| 2018/0129790 | A1* | 5/2018 | Nama | G06F 21/121 |
| 2018/0174250 | A1* | 6/2018 | Faulkner | G06F 3/0483 |
| 2018/0322259 | A1* | 11/2018 | Solow | H04L 9/0819 |
| 2019/0073704 | A1* | 3/2019 | Neiva de Medeiros | G06Q 30/0641 |
| 2019/0286794 | A1* | 9/2019 | Jose | G06F 21/105 |
| 2020/0065853 | A1* | 2/2020 | Cvinar | H04N 21/2743 |
| 2020/0240166 | A1* | 7/2020 | Graner | E04H 6/10 |
| 2021/0165857 | A1* | 6/2021 | Pease | G06Q 20/127 |

OTHER PUBLICATIONS

"Gamefly", Retreived From: https://www.gamefly.com/, Retreived On: Jul. 17, 2019, 2 Pages.
"How to buy or Rent Movies & TV Content on Windows 10", Retreived From: https://support.microsoft.com/en-us/help/3078426/how-to-buy-or-rent-movies-tv-content-on-windows-10, Retreived On: Jul. 17, 2019, 3 Pages.
"Purchase Your Rental", Retreived From: https://www.amazon.com/gp/help/customer/display.html?ie=UTF8&nodeId=201983640, Retreived On: Aug. 20, 2019, 2 Pages.
"Rentgames", Retreived From: https://rentgames.in/plan.html, Retreived On: Aug. 20, 2019, 3 Pages.
"GameLengths", Retreived From: http://www.gamelengths.com/#, Retrieved On: Sep. 19, 2019, 3 Pages.
Gough, Christina, "Retail Revenue of the U.S. Video Game Industry from Jan. 2017 to Mar. 2019 (in Billion U.S. Dollars)", Retreived From: https://web.archive.org/web/20190701051710/https:/www.statista.com/statistics/201093/revenue-of-the-us-video-game-industry/, Jul. 1, 2019, 5 Pages.
Jett, "Using 'Cost Per Hour' to Determine the Value of a Game", Retreived From: https://thirdpersonblog.wordpress.com/2010/09/08/using-cost-per-hour-to-determine-the-value-of-a-game/, Sep. 8, 2010, 6 Pages.
Law, Brian, "The Best Cloud Gaming Services: Welcome Gaming to the Web", Retreived From: https://www.cloudwards.net/top-five-cloud-services-for-gamers/, May 8, 2018, 12 Pages.
Liu, Hongju, "Dynamics of Pricing in the Video Game Console Market: Skimming or Penetration?", In Journal of Marketing Research, vol. 47, Issue 3, Jun. 2010, pp. 428-443.
Pope, Nick, "Sony Just Filed a New PlayStation 5 Patent, and it Could Save You a Lot of Money", Retreived From: https://www.esquire.com/uk/latest-news/a26983571/sony-just-filed-a-new-playstation-5-patent-and-it-could-save-you-a-lot-of-money/, Mar. 29, 2019, 9 Pages.
Suhay, Lisa, "PlayStation Now Opens up Online Game Rentals", Retreived From: https://www.csmonitor.com/Technology/Pioneers/2014/0801/PlayStation-Now-opens-up-online-game-rentals, Aug. 1, 2014, 3 Pages.

(56) References Cited

OTHER PUBLICATIONS

"FIFA 19", Retreived From: https://en.wikipedia.org/w/index.php?title=FIFA_19&oldid=861563694, Sep. 28, 2018, 3 Pages.

Orland, Kyle, "Sony's PlayStation Now pricing is insane, but it doesn't have to be", Retrieved From: https://arstechnica.com/gaming/2014/06/sonys-playstation-now-pricing-is-insane-but-it-doesnt-have-to-be/, Jun. 24, 2014, 7 Pages.

"Suggestion: Pay-Per-Playtime", Retrieved From: https://eu.battle.net/forums/en/wow/topic/17612873789, Aug. 1, 2016, 14 Pages.

* cited by examiner

DELIVERING DIGITAL CONTENT FOR AN APPLICATION

BACKGROUND

The present disclosure relates to devices and methods for providing digital content (e.g., applications, digital media, gaming content) to users. Today users have a few options on how to acquire the digital content they want to use. For example, users can purchase an application or game from a physical or digital store, sign-up for a subscription, such as, Game Pass or EA Access, use free applications or play free games, or use trials and demos of applications or games. However, when a user needs to use an application that does not have a trial or demo, the user may have to decide whether to pay the full price of the application to use the application. In addition, when a user is invited to play a game with friends that is not included in subscriptions and/or does not have a trial or demo, the user may have to decide whether to pay the full price of the game to play with their friends. The user may decide the price is too high and may skip using the application or playing the game with their friends. Content publishers may want to increase user engagement with applications or games even when the price of the application or game may otherwise prevent the users from using the application or playing the game.

These and other problems exist in regard to providing new or related digital content to end-users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example relates to a method. The method may include providing a license to a user for providing access to an application for a rental time. The method may include tracking an amount of use of the application. The method may include determining whether a license renewal time has expired based on the amount of use. The method may include renewing the license in response to the license renewal time expiring and decreasing the rental time by the license renewal time. The method may include determining whether the rental time has expired. The method may include extending or terminating the license based on a determination of whether the rental time expired.

Another example relates to a server. The server may include a memory to store data and instructions, and at least one processor configured to communicate with the memory, wherein the processor is operable to: provide a license to a user for accessing an application during a rental time; track an amount of use of the application; determine whether a license renewal time has expired based on the amount of use; renew the license in response to the license renewal time expiring and decreasing the rental time by the license renewal time; determine that the rental time has expired; and extend or terminate the license based on a determining of whether the rental time expired.

Another example relates to a non-transitory computer-readable medium storing instructions executable by a computer device. The computer-readable medium may include at least one instruction for causing the computer device to provide a license to a user to access an application during a rental time. The computer-readable medium may include at least one instruction for causing the computer device to track an amount of use of the application that indicates a total amount of time for accessing the application. The computer-readable medium may include at least one instruction for causing the computer device to use the amount of use of the application to determine whether a license renewal time has expired. The computer-readable medium may include at least one instruction for causing the computer device to renew the license in response to the license renewal time expiring and decreasing the rental time by the license renewal time. The computer-readable medium may include at least one instruction for causing the computer device to determine whether the rental time is expired. The computer-readable medium may include at least one instruction for causing the computer device to extend or terminate the license in response to a determination of whether the rental expired.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
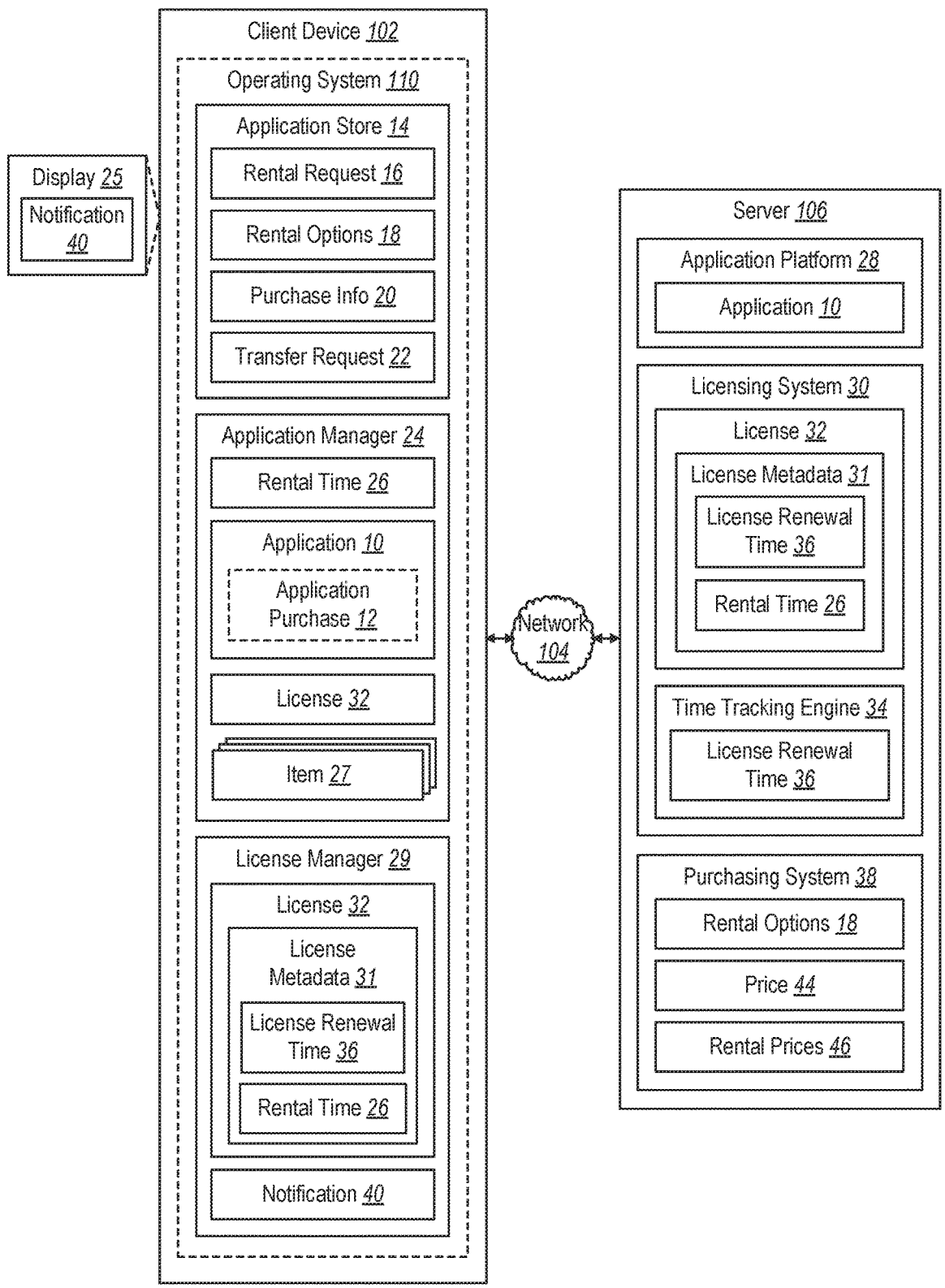
FIG. 1 illustrates an example system for providing digital content in accordance with one or more implementations of the present disclosure.

The present disclosure relates generally to devices and methods for providing users with digital content provided by one or more publishers. The present disclosure may provide digital rentals to one or more applications so that users have more options for accessing applications. One example application may include a digital game. As such, instead of purchasing an application at full price, users may rent an application for a time period without having to pay the full purchase price of the application. For example, if a user wanted to use a drawing application for a project, they may rent the drawing application for a rental time to complete the project instead of paying the full purchase price for the application.

Another example may include if a user is invited to play a digital soccer game with friends that the user does not own and is not included in a game pass, the user will have to decide whether to pay the full purchase price of the game to play the game with friends. Even if the user only wants to play the game for a couple of hours a night with friends, currently, the user only has the option to pay the full purchase price to play the game. If the user decides to not purchase the game and skip playing the game with friends, game publishers may lose revenue associated with that user.

While rental options may exist for applications (e.g., weekly, weekend rentals), rentals are often tied to a fixed period of time (e.g., 48 hours, 5 days) and unconnected with a quantity of use. As a result, the price and value of digital rentals are often non-commensurate with the value that users pay to receive or otherwise engage with the application content. Accordingly, where digital fixed rentals may be popular among a limited base of users having a predictable schedule or a time allocated to use applications, other individuals with less predictable schedules or who may only have an hour or two a week may simply opt out of using applications altogether as the price for purchasing an application is prohibitive and renting applications for a fixed duration of time does not correspond to their individual preferences.

The devices and methods provide digital rentals to users so that users have more options for accessing applications. Instead of purchasing an application at a full purchase price, or accessing an application through a subscription, users may select to rent an application for a time period to use the application without having to pay the full purchase price of the application. As used herein, a "digital rental" may refer to a digital rental of an application, such as, but not limited to, a game for a period of time corresponding to a quantity of use by one or multiple users.

The devices and methods may determine different rental options for a license to access the applications. One example rental option may include burndown rentals. Users may indicate a specific amount of time the users want to use the applications and may rent the applications for a specific amount of time for a price. For example, users may want to use an application for three hours. Another rental option may include hourly rentals where a user agrees to pay a rate for an indeterminate number of hours to access the applications.

The devices and methods may track a total amount of use for the application and determine when the rental time is about to expire and/or expired for the license. The devices and methods may provide an option to extend the rental time and continue the license for accessing the application. As such, users may refill the rental time and/or add additional rental time to the license to extend the application access.

The devices and methods may also allow users an option to transfer rental time to other users. A user may receive rental time for accessing the application and/or purchase rental time for accessing the application and may transfer the rental time to another user so that users may have an opportunity to provide the rental time as a gift to other users.

As such, digital rentals in accordance with one or more implementations described herein may provide the flexibility users need in accessing digital content. For example, digital rentals may allow users to use applications the users may never otherwise have given a chance. Digital rentals may also provide users with inexpensive and easy access to applications. Moreover, application publishers may no longer need to build out and support separate demo products for applications for users to try out an application, which may be difficult for smaller publishers. Instead, application publishers may provide digital rentals for the application and may receive rental revenues, which application publishers do not receive for trials. Thus, digital rentals may provide application publishers with increased revenue opportunities and increased user engagement.

Referring now to FIG. 1, illustrated is an example system 100 for providing digital rentals for applications. System 100 may include one or more servers 106, which may refer to servers of application platforms. Server(s) 106 may include an application platform 28 that provides one or more applications 10 to one or more client devices 102. One example application 10 may include a digital game. Client devices 102 may download the applications 10 from server(s) 106 and/or may directly access the applications 10 from servers(s) 106 (e.g., streaming applications 10 from server(s) 106). Server(s) 106 may receive application(s) 10 from one or more third party servers, which may include any number of publisher systems for applications 10. Each of the components of the computing device 102 may be implemented on an operating system 110 of the client device 102.

The publisher system(s) may include application servers (e.g., third-party application servers) that host or otherwise serve application content to the plurality of client devices 102. In one or more implementations, one or more of the publisher systems may be implemented as part of or on the same network of server(s) 106 as the application platform 28 service. Indeed, in one or more implementations, the application platform 28 service includes one or more publisher systems implemented thereon.

Each of the application platform 28 service and publisher systems can provide content to the client devices 102 and collect application data (e.g., telemetry data) associated with respective users of the client devices 102. For example, the application data may include an amount of time a user spends accessing the content of the application. The application platform 28 and the publisher system(s) may provide respective types of application data to the licensing system 30. The application platform 28 and/or the publishing systems may be on the same server 106 as the licensing system 30 or on other servers in communication with the licensing system 30. The licensing system 30 may use the application data in determining a license(s) 32 to provide for application(s) 10 and the associated rights for accessing application (s) 10.

The server(s) 106 and client device(s) 102 may communicate with each other directly or indirectly through a network 104. The network 104 may include one or multiple networks and may use one or more communication platforms or technologies suitable for transmitting data. The network 104 may refer to any data link that enables transport of electronic data between devices and/or modules of the system 100. The network 104 may refer to a hardwired network, a wireless network, or a combination of a hardwired and a wireless network. In one or more implementations, the network 104 includes the Internet.

The client devices 102 may refer to various types of computing devices. For example, one or more of the client devices 102 may include a mobile device such as a mobile telephone, a smart phone, a personal digital assistant (PDA), a tablet, or a laptop. Additionally, or alternatively, the client devices 102 may include one or more non-mobile devices such as a desktop computer, server device, or other non-portable device. In one or more implementations, the client devices 102 refer to dedicated gaming devices (e.g., handheld gaming devices) or a video game console in communication with a display device. In one or more implementations, one or more of the client devices 102 include graphical user interfaces thereon (e.g., a screen of a mobile device). In addition, or as an alternative, one or more of the client devices 102 may be communicatively coupled (e.g., wired or wirelessly) to a display device having a graphical user interface thereon for providing a display of application content. The server(s) 106 may similarly refer to various types of computing devices. Each of the devices of the system 100 may include features and functionality described below in connection with FIG. 5.

Client device 102 may include an application manager 24 that facilitates access to available application 10 on server 106. Application manager 24 may communicate with an application store 14, or other publisher systems, that may provide a list of available application 10 and any available options for accessing applications 10. Available options for accessing applications 10 may include, for example, purchasing applications 10, using subscriptions for applications 10, and/or renting applications 10.

In one or more implementations, application store 14 may identify one or more items 27 (e.g., in-application items or application add-ons) used and/or consumed within application 10 that may be rented by a user. Item 27 may include, but are not limited to, costumes, dance moves, music, expansion packs, power-ups, downloadable content, or other items or add-ons that may be purchased in conjunction with a corresponding application 10. For example, a user may want to rent a dance move to use for an amount of time while playing a game. Application manager 24 may provide a message or other notification 40 identifying the available items 27 for rent and/or any associated rental prices 46 for the items 27. For example, notification 40 may be displayed over a portion of the application content, may be sent via an email, text message, or other communication displayable via a graphical user interface. A user may provide input or otherwise select to rent application 10. For example, a user may select a rental icon associated with application 10 or an item 27.

Application store 14 may also coordinate the rental information for application 10. When a user selects to rent application 10, application store 14 may send a rental request 16 for application 10 to server 106. The rental request 16 may include, but is not limited to, a user identification (ID), a client device ID, and/or application information. In addition, when a user selects to rent one or more items 27 within application 10, the rental request 16 may include an item ID, a user ID, a client device ID, and/or the application information.

Server 106 may include a licensing system 30 that receives the rental request 16 for application 10. Licensing system 30 may access a license datastore to determine whether a license 32 is already associated with the user ID for application 10. If a license 32 already exist for the user ID, licensing system 30 may transmit the license 32 to client device 102 so that the user may access application 10 via client device 102 using the license 32. In addition, if a license 32 already exists for the items 27, licensing system 30 may transmit the license 32 for the items 27 to client device 102 so that the user may access the items 27 in application 10. As such, licensing system 30 may not provide a rental for application 10 when a user currently owns a license 32 for application 10 or items 27.

Licensing system 30 may communicate with a purchasing system 38 in determining what rights may be granted to the user ID for use with application 10 when a license 32 is not already associated with the user ID. For example, purchasing system 38 may determine a rental time 26 for application 10 or items 27. In an implementation, purchasing system 38 may be on the same server 106 as the licensing system 30.

In another implementation, purchasing system 38 may be on separate severs in communication with the licensing system 30.

Purchasing system 38 may receive one or more rentals options 18, rental prices 46, and/or a price 44 for purchasing application 10 from a publisher system. For example, an application publisher may set a rental price 46 for application 10. In addition, purchasing system 38 may determine one or more rental options 18 and/or rental prices 46 for application 10. For example, purchasing system 38 may use received price information (e.g., price 44 for purchasing application 10) in combination with an estimated length of use for application 10 in determining the rental options 18 and/or rental prices 46 for application 10.

The rental prices 46 may be set by dividing a current purchase price 44 of application 10 by an estimated length of use. When the application is a game, an estimated length of use may be determined using, for example, a genre of the game, previous titled played, or catalog. For example, a game with a purchase price of sixty dollars that on average takes twenty hours to complete may have a rental price 46 of three dollars per hour. Games may be highly variable in the length of play. For example, games can range between four hours for one user up to eighty hours for another user. As such, the estimated length of use may vary between applications 10 and/or different users.

One example rental option 18 may include a burndown rental where users rent a specific amount of use at a corresponding rental price 46. The users indicate an amount of time they want to access application 10 (e.g., three hours) and pay the determined rental price 46 for the specified amount of time. A clock on the burndown rental may start as soon as a user accesses the content of application 10 and the remaining rental time may decrease in response to content access. A user may be notified of as the rental time is used and may be presented with opportunities to extend the rental time. If the rental time is not extended, the user may be notified that the rental has expired, and the application may end.

For example, a burndown rental for a digital soccer game that cost sixty dollars to purchase and takes on average twenty hours to complete may have a rental price 46 of three dollars per hour. The burndown rental may be selected by users that want the ability to have an occasional game session with friends or who may have a limited amount of free time to play games. Moreover, the burndown rental may provide additional revenue sources to game publishers who are normally priced out of more casual gaming demographics.

An example use case for a burndown rental may include a user, Vivienne, is invited to play a digital soccer game with friends every Saturday between 3:00 p.m. and 6:00 p.m. Vivienne may not be sure she can join her friends every weekend. Vivienne is happy to have an option to rent the digital soccer game for a few dollars on the days she can play with her friends.

Another example rental option 18 may include an hourly rental or other time rental where users agree to a specific rental price 46 for an indeterminate amount of use (e.g., pay an amount of money per hourly rental). Users may be billed in response to the usage of application 10. Users may be notified of an amount of time spent accessing content for application 10. For example, the rental price 46 may be determined in response to current application prices 44 set by a publisher system. Another example may include the rental price 46 preset by a publisher system. Hour rentals may provide users an opportunity to try an application that the users may otherwise be priced out of purchasing.

Purchasing system 38 may also use other factors in setting the rental prices 46 for application 10. For example, if a user has an identified subscription, purchasing system 38 may set the rental prices 46 at zero, or an otherwise reduced amount, in connection with the subscription to promote application 10 or any items 27 within application 10 to the user. Another example may include setting the rental prices 46 for application 10 to zero, or an otherwise reduced amount, for the first application rental or first item rental. Another example may include providing a credit for the rental price 46 for a set number of hours when a new application launches, or a new item launches to promote the new application or new item. Another example may include using the gaming history of a user for providing a credit for the rental price 46 for a set number of hours. If a user typically purchases a new game version within two weeks of a game release and has not purchased a recently released version of a game, purchasing system 38 may set the rental price 46 to zero, or an otherwise reduced amount, to promote the new version of the game to the user.

In addition, the rental prices 46 may change in response to various promotions the publisher system may have for application 10. For example, application 10 may be on sale and purchasing system 38 may reduce the rental prices 46 during the sale and may increase the rental prices 46 at the end of the sale. As such, the rental prices 46 may be dynamic and change in response to a variety of factors.

Purchasing system 38 may also use the rental prices 46 and/or a total amount of rentals for application 10 towards the purchase price 44 for application 10. In addition, purchasing system 38 may use discounts or other incentives to promote application purchases. For example, if the price 44 for a digital soccer game is typically sixty dollars with the total amount of rentals for the digital soccer game at thirty dollars. If purchasing system 38 receives a notification of a price drop to forty dollars for the digital soccer game, purchasing system 38 may apply the total amount of rentals for the digital soccer game (e.g., thirty dollars) to the sale price of forty dollars and may determine that the digital soccer game may be purchased for ten dollars.

Purchasing system 38 may transmit the one or more rental options 18 with the rental prices 46 for application 10 and/or any purchasing options for application 10 to the application store 14. The application store 14 may present the rental options 18 and/or purchasing options via display 25. The rental options 18 may include, for example, a burndown rental or an hourly rental. The rental options 18 may also include the rental prices 46 and/or an option to select a rental time 26 for playing application 10 or using one or more items 27 within application 10. A user may provide purchase information 20 by selecting one of the rental options 18 and/or purchase options. For example, the purchase information 20 may include a selected rental time 26 (e.g., four hours or an indeterminate amount of time), the selected item(s) 27, the rental price 46 selected for application 10 or item(s) 27, and/or any payment received for the rentals.

The application store 14 may transmit the purchase information 20 to purchasing system 38 on server 106. Purchasing system 38 may use the purchase information 20 to notify licensing system 30 of the selected rental time 26 (e.g., a set time or an indeterminate amount of time) and/or any selected item(s) 27.

Licensing system 30 may generate a license 32 granting a user access to application 10 or item(s) 27 for the selected rental time 26. License 32 may include license metadata 31 that identifies when license 32 expires. For example, the license metadata 31 may indicate that license 32 may provide access to application 10 or item(s) 27 during the selected rental time 26. License metadata 31 may also include a license renewal time 36 for sending requests for renewing the license 32. The license renewal time 36 may be a set time period (e.g., 3 minutes or five minutes) when a license renewal request is sent to renew license 32. The license renewal time 36 may be adjusted for different application 10 and/or different users. When the license renewal time 36 is reached, the license 32 a request to renew license 32 may be sent. If time remains for the selected rental time 26, license 32 may be renewed allowing the access to application 10 and/or item(s) 27 to continue. As such, the license 32 may be continually renewed during the selected rental time 26 at the license renewal time 36 until expiration of the selected rental time 26.

Licensing system 30 may use the license renewal time 36 to track the amount of time a user has accessed application 10 and/or item(s) 27 to ensure the user does not exceed the rental time 26 associated with the license 32. In real time or at incremental intervals, licensing system 30 may transmit the license 32 with the license metadata 31 to a license manager 29 on client device 102.

Application manager 24 may launch application 10 for accessing application 10 using client device 102 or installing application 10 on client device 102. For example, application manager 24 may launch application 10 in response to purchasing rental time 26 for application 10. Application 10 may run on client device 102 and/or may be accessed on server 106 using client device 102 (e.g., application 10 may be streamed to client device 102 from server 106). When launching application 10, license manager 29 may send a request to licensing system 30 for a license 32 to access application 10.

License manager 29 may receive license 32 from licensing system 30 and license manager 29 may provide application manager 24 with a notification 40 indicating that the rental time 26 has started with information about the rental time 26. For example, notification may state that there is ten hours of rental time 26 remaining for application 10. License manager 29 may verify that license 32 is valid and/or from a trusted provider. License manager 29 may also access the license metadata 31 to determine the license renewal time 36 and/or the rental time 26 for license 32. License manager 29 may communicate the license information with application manager 24.

In one or more implementations, license manager 29 may provide application manager 24 with a notification 40 indicating that the user may allow another user to share the rental time 26 of license 32. As such, instead of the user accessing application 10 for the balance of the rental time 26, the user may allow another user to access application 10 under the license 32 for the rental time 26, or a portion of the rental time 26. If the user selects to share the rental time 26 with another user, application store 14 may send a transfer request 22 to licensing system 30 with the identification of the other user to receive the selected amount of the rental time 26. Licensing system 30 may transmit the license 32 for the rental time 26 to the client device 102 of the other user and the other user may be able to access application 10 for the rental time 26. As such, users may gift the received licensed 32 for the rental time 26 to another user.

Licensing system 30 may include a time tracking engine 34 that may track a time of use in a number of ways. For example, in one or more implementations, time tracking engine 34 may track a number of licenses distributed to a user (or other users with whom the rental has been shared) to determine a total amount of time that a user has access application 10 and/or item(s). In one or more embodiments, time tracking engine 34 may track the amount of use by incrementing a time associated with each license distribution (e.g., 5 minutes per license distributed) until an amount of rental time has expired. As another example, time tracking engine 34 may implement a clock or other tracking mechanism to track an amount of time associated licenses that have been distributed to best determine an accurate amount of use for a specific title or item.

When the amount of time reaches, or exceeds, the license renewal time 36, time tracking engine 34 may reduce the rental time 26 by the license renewal time 36 and licensing system 30 may be notified to send a new license 32 for the remaining rental time 26 to client device 102. For example, if the license renewal time 36 is five minutes, when the amount of time reaches five minutes, the rental time 26 may be decreased by five minutes and a new license 32 may be requested. By constantly renewing license 32 at the license renewal time 36 and decreasing the rental time 26 by the license renewal time 36, licensing system 30 may ensure that the amount of use of application 10 or item 27 does not exceed the rental time 26.

In one or more implementations, time tracking engine 34 may track a quantity of use based on information received from client device 102. For example, in one or more implementations, the client device 102 may locally track a time of use and provide an indication of the time of use to time tracking engine for updating a current rental time 26. Optionally, application manager 24 may track use and provide further access data to licensing system 30 for use in determining a time of use for application 10 or item 27. For example, in one or more implementations, licensing system 30 may track online gameplay of application 10 based on distributed licenses or other mechanism while client device 102 may track offline gameplay of application 10 and provide updated gameplay information upon logging on or reconnecting with server 106.

Where a single user is consuming the rental time, time tracking engine 34 may simply track a time associated with each license that is distributed to the user (e.g., based on a number of licenses or tracking a time of access). Where a user shares the license with one or more additional users, the time tracking engine 34 may track rental time for each of the users on each of one or more client devices. This may include distributing licenses or copies of a user's license to each of multiple client devices and incrementing a rented amount of use at a rate multiplied by the number of users concurrently playing the application. Accordingly, where a user rents four hours of rental time for the user and three friends to use an application simultaneously (e.g., play a game together), time tracking engine 34 may count the use of the application at a rate of four times the conventional rate as would be applied for a single user. As such, the user and three friends may receive 1 total hour of application use between the four users.

When the rental time 26 is close to expiring (e.g., almost to zero), a notification 40 may be sent to a user indicating that the rental time 26 is almost up. The notification 40 may provide the user a selectable option to extend the rental time 26. For example, the user may select to purchase additional rental time 26 and/or select a different rental option 18 for application 10 or item(s) 27. The user may also select to purchase the application 10 or any item(s) 27 that may be available for purchase.

In one or more implementations, application 10 may determine a time when extending the rental time 26 may be beneficial to a user. For example, application 10 may include an application purchase 12 component that compares the remaining rental time 26 to a level the user is about to access in application 10 and application 10 may determine that the remaining rental time 26 is insufficient to complete the level. Application purchase 12 component may include similar features as application store 14. A notification 40 may be sent to the user identifying that the rental time 26 is almost up and providing the user with an option to extend the rental time 26. The notification 40 may also provide information for an amount of time that may be necessary to complete the level of application 10. As such, the option to extend the rental time 26 may be dynamic in response to actions the user is performing in application 10 in combination with a remaining amount of rental time 26.

When the rental time 26 expires, the license 32 may end and the application 10 may be terminated. The user may no longer be able to access application 10 without an additional license 32.

System 100 may provide users of client device 102 with inexpensive and easy access to digital content. Moreover, system 100 may provide application publishers with increased revenue opportunities and increased user engagement with application.

Figure 2A:
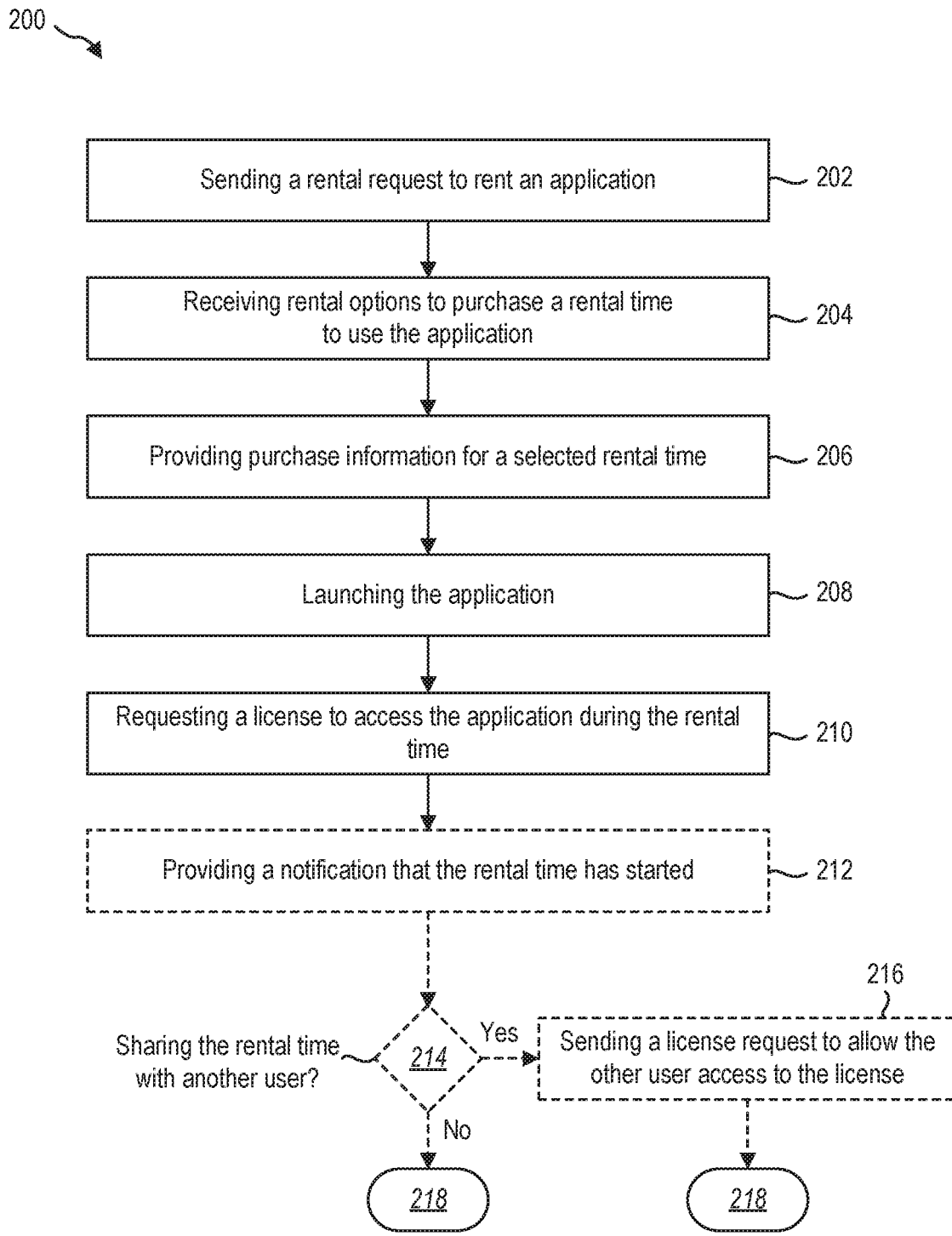
FIGS. 2A and 2B illustrate an example flow diagram of a method for requesting an application rental in accordance with one or more implementations of the present disclosure.
Figure 2B:
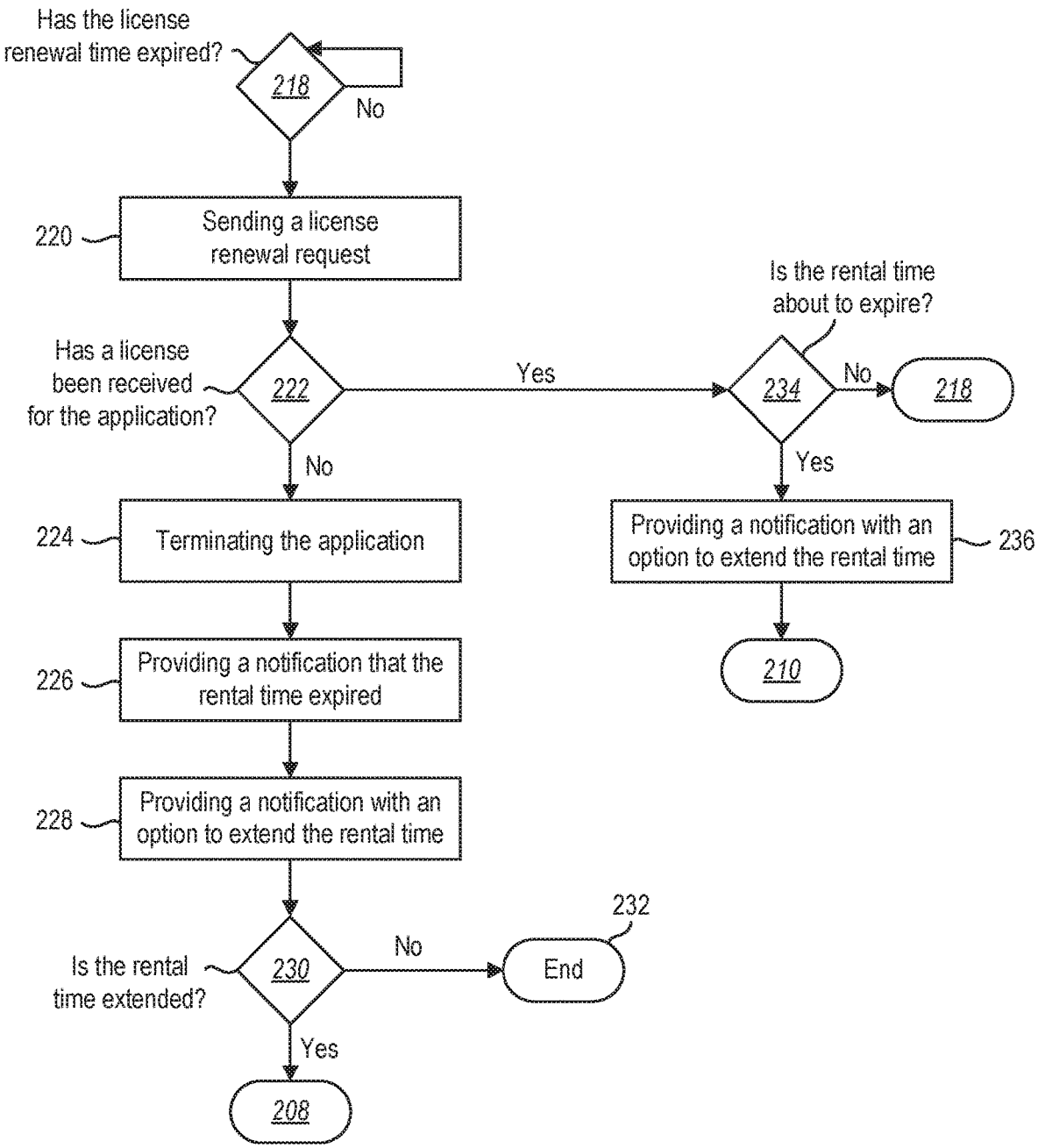

Referring now to FIGS. 2A and 2B, an example method 200 may be used by client device 102 (FIG. 1) for requesting an application rental. The actions of method 200 may be discussed below with reference to the architecture of FIG. 1.

At 202, method 200 may include sending a rental request to rent an application. A user of client device 102 may use display 25 to select an option to rent application 10. Applications 10 may include, but are not limited to, a digital game. For example, application store 14 may provide a list of available applications 10 and any available options for accessing applications 10. Available options for accessing applications 10 may include purchasing applications 10, using a subscription to access applications 10, and/or renting applications 10.

In one or more implementations, application store 14 may identify one or more items 27 used and/or consumed within application 10 that may be rented by a user. Items 27 may include, but are not limited to, costumes, dance moves, music, expansion packs, power-ups or other add-ons to application 10. For example, a user may want to rent a dance move to use for an amount of time while playing a game. Messages or other notification 40 may identify the available items 27 for rent.

Application store 14 may also coordinate the rental information for application 10. When a user selects to rent application 10 and/or any items 27, application store 14 may send a rental request 16 for application 10 to server 106. The rental request 16 may include, but is not limited to, an item ID, a user ID, a client device ID, and/or the application information.

At 204, method 200 may include receiving rental options to purchase rental time to use the application. Application store 14 may present the received rental options 18 and/or purchasing options from server 106 via a graphical user interface on display 25. The rental options 18 may include the rental prices 46 and/or an option to select a rental time 26 for using application 10. The rental options 18 may also include the rental prices 46 and/or a rental time 26 for using one or more items 27. An example rental option 18 may include an hourly rental or other time period rental where users agree to a specific rental price 46 for an indeterminate amount of use (e.g., pay an amount of money per hourly rental). Another example rental option 18 may include a burndown rental where users rent a specific amount of time at a rental price 46. The users may indicate an amount of time they want to access application 10 (e.g., three hours) and pay the determined rental price 46 for the specified amount of time.

At 206, method 200 may include providing purchase information for a selected amount of rental time. A user may provide purchase information 20 by selecting one of the rental options 18 and/or purchase options. For example, the purchase information 20 may include a selected rental time 26 (e.g., four hours or an indeterminate amount of time), the selected item(s) 27, the rental price 46 selected for application 10 or item(s) 27, and/or any payment received for the rentals.

At 208, method 200 may include launching the application. Application manager 24 may launch and/or install application 10. For example, application 10 may run on client device 102 and/or may be accessed on server 106 using client device 102 (e.g., streaming application 10 from server 106).

At 210, method 200 may include requesting a license to access the application during the rental time. License manager 29 may send a request to licensing system 30 for a license 32 for application 10 in response to launching application 10 using client device 102 and/or installing application 10 on client device 102. License manager 29 may receive license 32 from licensing system 30 and may perform a verification to ensure that license 32 is valid and/or received from a trusted provider. License manager 29 may also access license metadata 31 for license 32. License metadata 31 may include, but is not limited to, the rental time 26 for accessing application 10 and/or a license renewal time 36 for renewing license 32. License manager 29 may use license 32 to provide application manager 24 with access to application 10. In addition, license manager 29 may provide the license metadata 31 to application manager 24. For example, license manager 29 may provide the rental time 26 for license 32 to application manager 24.

At 212, method 200 may optionally include providing a notification that the rental time has started. When accessing application 10, license manager 29 may provide application manager 24 a notification 40 indicating that the rental time 26 has started with information about the rental time 26. For example, notification 40 may be displayed over a portion of the application content and include a message indicating that there is ten hours of rental time 26 remaining for application 10.

At 214, method may optionally include determining whether to share the rental time with another user. License manager 29 may provide a notification 40 indicating that the user may allow another user to share the license 32. As such, instead of the user accessing application 10 for the rental time 26, the user may allow another user to access the license 32 and rental time 26, or a portion of the rental time 26.

At 216, method may optionally include sending a license request to allow the other user to access the license. If the user selects to share the license 32, application store 14 may send a transfer request 22 to licensing system 30 with the identification for the other user to receive access to the license 32 and any selected amount of the rental time 26 that the other user may access. Licensing system 30 may provide access to the license 32 for the rental time 26 to the other user and the other user may be able to access application 10 for the rental time 26. In an implementation, licensing system 30 may provide the other user an entitlement to access license 32 for the rental time 26. For example, the entitlement may be another license granting the other user access to application 10 for the shared rental time 26. As such, users may provide the rental time 26 as gifts to other users.

At 218, method 200 may include determining whether the license renewal time has expired. License manager 29 may access the license metadata 31 to determine whether the license renewal time 36 has expired. The license renewal time 36 may be a fixed amount of time when license manager 29 sends a request to renew license 32.

At 220, method 200 may include sending a license renewal request. License manager 29 may wait for the duration of the license renewal time 36 before sending a license renewal request to renew license 32. As such, license manager 29 may wait for the license renewal time 36 to expire before renewing license 32 for the remaining rental time 26. By having the license renewal time 36 at a different value than the rental time 26, connectivity issues with application 10 may be minimized during the license renewal process.

At 222, method 200 may include determining whether a license is received for the application. License manager 29 may perform a verification to ensure that license 32 is received for application 10 from licensing system 30 and/or that license 32 is not expired. License manager 29 may receive license 32 for application 10 when an amount of time that a user accessed application 10 is less than rental time 26.

For example, if the rental time 26 is six hours for a digital soccer game and if a user plays the digital soccer game using client device 102 for one hour on Monday and uses a different client device to play the soccer game for three hours on Saturday, the tracked amount of use may be four hours (e.g., the total amount of time the user played the digital soccer game). As such, if the user uses different client devices to play the soccer game, the amount of use for the soccer game may be tracked across the various client devices. License manager 29 may receive license 32 for the user to access the digital soccer game for two more hours (e.g., the remaining rental time 26 for accessing the digital soccer game). The user may use any one of the client devices to play the soccer game for the remaining rental time 26.

At 224, method 200 may include terminating the application. If license manager 29 determines that license 32 is not available for application 10 and/or has expired, license manager 29 may communicate with application manager 24 to terminate application 10. For example, license manager 29 may determine that license 32 has expired when the license metadata 31 indicates that the rental time 26 is zero. In addition, license manager 29 may determine that license 32 is not available in response to not receiving license 32 from licensing system 30. Application manager 24 may terminate application 10 and the user may no longer have access to application 10. For example, a notification 40 may be provided to the user indicating that the application is over.

At 226, method 200 may include providing a notification that the rental time expired. For example, license manager 29 may send a notification 40 to inform the user that the rental time 26 is up. For example, notification 40 may be displayed over a portion of the application content, may be sent via an email, text message, or other communication displayable via a graphical user interface.

At 228, method 200 may include providing an option to extend the rental time. Application store 14 may provide a notification 40 or other message to the user with an option to purchase additional rental time 26 and/or select a different rental option 18 for application 10 or items 27.

At 230, method 200 may include determining whether the rental time is extended. For example, application store 14 may determine whether a user selects to purchase additional rental time 26 and/or selects a different rental option 18 for application 10 or item(s) 27. Application store 14 may also determine whether the user selects to purchase application 10 or any item(s) 27 available for purchase.

Method 200 may return to 208 and may launch the application when a user selects to purchase additional rental time. License manager 29 may send a request for a license 32 for the additional rental time 26 in response to application 10 launching. Application manager 24 may continue to provide access to application 10 for the rental time 26 using license 32. Thus, a user may continue to use application 10 for the additional rental time 26 purchased. If the user does not extend the rental time 26, method 200 may proceed to 232 and may end.

At 234, method 200 may optionally include determining whether the rental time is about to expire. License manager 29 may access the license metadata 31 to determine the available rental time 26 for license 32. License manager 29 may determine that the rental time 26 is about to expire when the rental time 26 is near zero. In addition, license manager 29 may determine that the rental time 26 is about to expire when the rental time 26 is less than the license renewal time 36.

In one or more implementations, application 10 may determine a time when extending the rental time 26 may be beneficial to a user. For example, application 10 may include an application purchase 12 component that compares the remaining rental time 26 to a level the user is about to access in application 10 and application 10 may determine that the remaining rental time 26 is insufficient to complete the level.

At 236, method 200 may include providing a notification with an option to extend the rental time. An application purchase component 12 or application store 14 may send a notification 40 to the user identifying that the rental time 26 is almost up and providing the user with an option to extend the rental time 26. The notification 40 may also provide information for an amount of time that may be necessary to complete the level of application 10. As such, the option to extend the rental time 26 may be dynamic in response to actions the user is performing in application 10 in combination with a remaining amount of rental time 26.

Application purchase component 12 or application store 14 may also determine whether a user selects to purchase additional rental time 26 and/or selects a different rental option 18 for application 10 or item(s) 27. Application purchase component 12 or application store 14 may also determine whether the user selects to purchase the application 10 or any item(s) 27 available for purchase. When the user purchases additional rental time 26, method 200 may return to 210 and may receive license 32 for the additional rental time 26 purchased. If the user does not purchase additional rental time 26, method 200 may return to 210 and may receive license 32 for the remaining rental time 26 for accessing application 10.

As such, method 200 may provide users with inexpensive access to application content. In addition, method 200 may provide users with more flexibility in accessing application content.

Figure 3A:
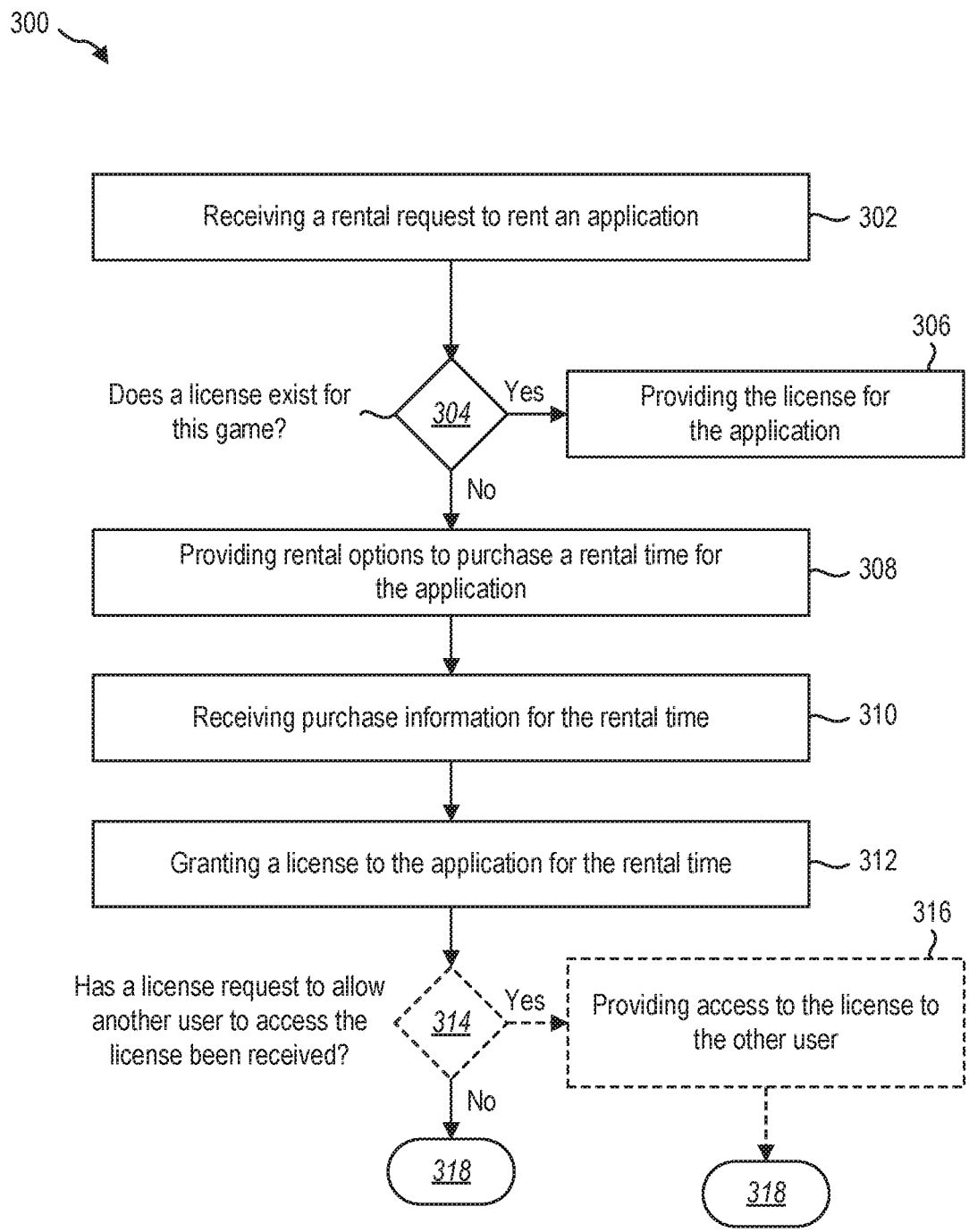
FIGS. 3A and 3B illustrate an example flow diagram of a method for providing a license for an application rental in accordance with one or more implementations of the present disclosure.
Figure 3B:
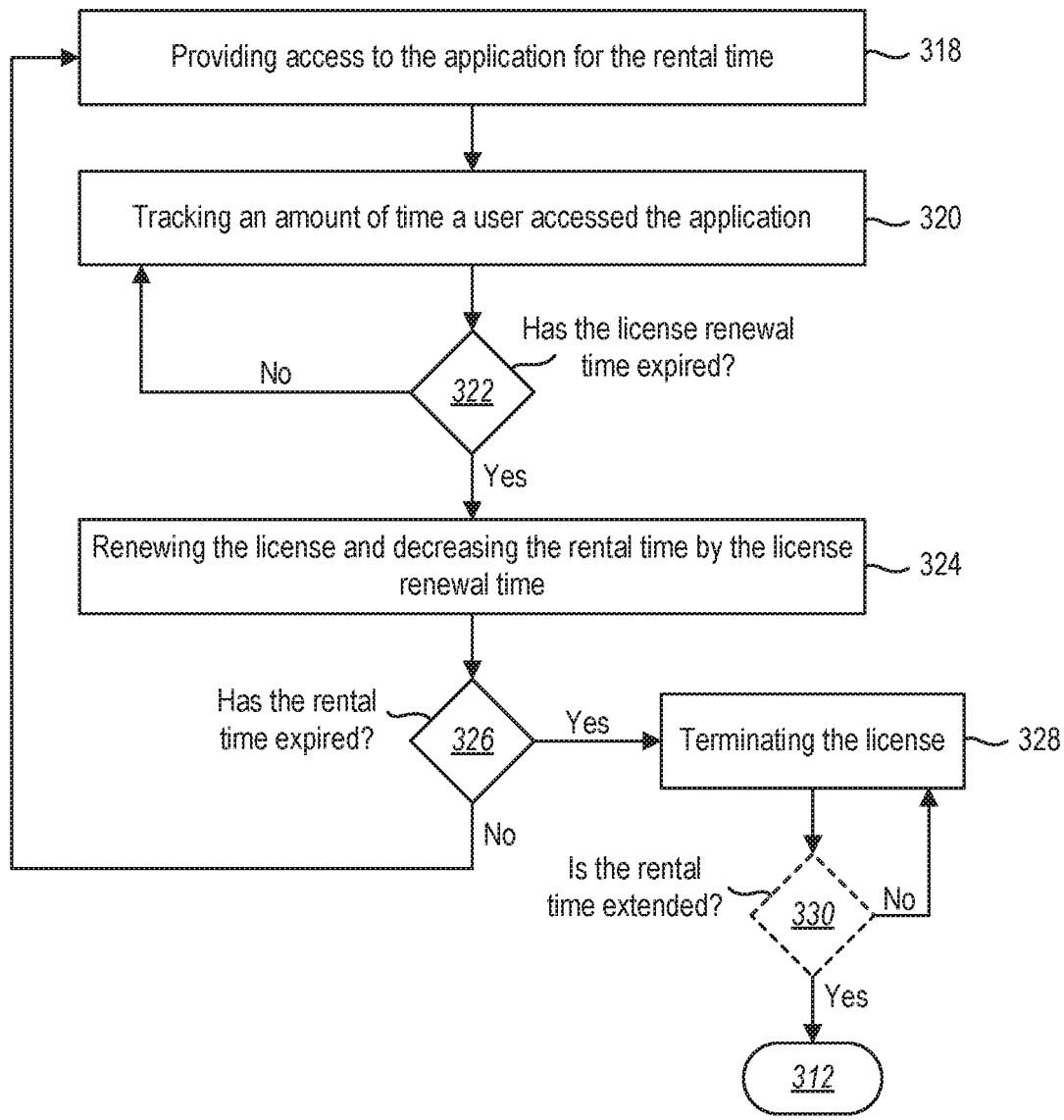

Referring now to FIGS. 3A and 3B, method 300 may be used by a server 106 (FIG. 1) for providing a license 32 (FIG. 1) to rent an application 10 (FIG. 1). The actions of method 300 may be discussed below with reference to the architecture of FIG. 1.

At 302, method 300 may include receiving a rental request to rent an application. A licensing system 30 may receive the rental request 16 for application 10 from client device 102. One example application 10 may include a digital game. In addition, the rental request 16 may identify any items 27 a user may want to rent in application 10. For example, the rental request 16 may include an item ID, a user ID, a client device ID, and/or application information.

At 304, method 300 may include determining whether a license exists for the application. Licensing system 30 may access a license datastore to determine whether a license 32 is already associated with the user ID for application 10 (e.g., if the user currently owns the application or items).

At 306, method 300 may include providing the license for the application. If a license 32 already exist for the user ID, licensing system 30 may transmit the license 32 to client device 102 so that the user may access application 10 via client device 102 using the license 32. In addition, if a license 32 already exists for the items 27, licensing system 30 may transmit the license 32 for the items 27 to client device 102 so that the user may access the items 27 in application 10. As such, licensing system 30 may not provide a rental for application 10 or items 27 when a license 32 is already owned for application 10 or items 27.

At 308, method 300 may include providing rental options to purchase an amount of rental time for the application. Licensing system 30 may communicate with a purchasing system 38 in determining what rights may be granted to the user ID for use with application 10 when a license 32 is not already associated with the user ID. Purchasing system 38 may transmit the one or more rental options 18 with the rental prices 46 for application 10 and/or any purchasing options for application 10 to application store 14 on client device 102.

The one or more rental options 18 may include, but are not limited to, an hourly rental or other time period rental where users agree to a specific rental price 46 for an indeterminate amount of use (e.g., pay an amount of money per hourly rental) and a burndown rental where users rent a specific amount of time at a rental price 46.

Purchasing system 38 may determine a rental time 26 for application 10 or items 27. In addition, purchasing system 38 may receive one or more rentals options 18, rental prices 46, and/or a purchase price 44 from an application publisher. Purchasing system 38 may use the received price information from the publisher system in determining one or more rental options 18 and/or rental prices 46 for application 10.

For example, purchasing system 38 may use the received price information (e.g., price 44 for purchasing application 10) in combination with an estimated length of use for application 10 in determining the rental options 18 and/or rental prices 46 for application 10. Purchasing system 38 may also use other factors, such as, but not limited to, gaming history of the user, subscriptions owned by the user, and/or promotions by the publisher in determining the rental options 18 and/or rental prices 46 for application 10. As such, the rental prices 46 may be dynamic and change in response to a variety of factors.

At 310, method 300 may include receiving purchase information for the rental time. Purchasing system 38 may receive the purchase information 20 for the rental time 26 from client device 102 and may use the purchase information 20 to notify licensing system 30 of the selected rental time 26 (e.g., a set time or an indeterminate amount of time) and/or any selected item(s) 27.

At 312, method 300 may include granting a license to the application for the rental time. Licensing system 30 may generate a license 32 granting a user access to application 10 or item(s) 27 for the selected rental time 26. Licensing system 30 may also determine a license renewal time 36 for renewing the license 32. The license renewal time 36 may be a fixed amount of time (e.g., five minutes) when the licenses 32 is renewed. The license renewal time 36 and/or the rental time 26 may be included in license metadata 31 associated with license 32. Licensing system 30 may transmit the license 32 and/or the license metadata 31 to license manager 29 on client device 102.

At 314, method 300 may include determining whether a request to allow another user to access the license has been received. If the user selects to provide another user access to license 32, licensing system 30 may receive a transfer request 22 with the identification of the other user to receive access to the license 32 and any selected amount of the rental time 26 that the other user may access.

At 316, method 300 may include providing access to the license to the other user. Licensing system 30 may provide the other user access to the license 32 for the rental time 26 so that the other user may be able to access application 10 for the rental time 26. In an implementation, licensing system 30 may provide the other user an entitlement to access license 32 for the rental time 26. The entitlement may be another license granting the other user access to application 10 for the shared rental time 26. As such, users may gift the received license 32 for the rental time 26 to another user.

At 318, method 300 may include providing access to an application for the rental time. Licensing system 30 may provide one or more licenses 32 during the rental time 26 so that the user may access application 10.

At 320, method 300 may include tracking an amount of time a user accessed the application. A time tracking engine 34 may track a time of use of application 10 in several ways. For example, in one or more implementations, time tracking engine 34 may track a number of licenses distributed to a user (or other users with whom the rental has been shared) to determine a total amount of time that a user has access application 10 and/or item(s). In one or more embodiments, time tracking engine 34 may track the amount of use by decreasing a time associated with each license distribution (e.g., 5 minutes per license distributed) until an amount of rental time has expired. As another example, time tracking engine 34 may implement a clock or other tracking mechanism to track an amount of time associated licenses that have been distributed to best determine an accurate amount of use for a specific title or item.

Where a single user is consuming the rental time, time tracking engine 34 may simply track a time associated with each license that is distributed to the user (e.g., based on a number of licenses or tracking a time of access). Where a user shares the license with one or more additional users, the time tracking engine 34 may track use for each of the users on each of one or more client devices. This may include distributing licenses or copies of a user's license to each of multiple client devices and incrementing an amount of use at a rate multiplied by the number of users concurrently accessing the application. Accordingly, where a user rents four hours of rental time for the user and three friends to play a game simultaneously, time tracking engine 34 may count use of application 10 at a rate of four times the conventional rate as would be applied for a single user. As such, the user and three friends may receive 1 total hour of use between the four users.

At 322, method 200 may include determining whether the license renewal time expired. The amount of time a user accessed an application may be used in determining whether the license renewal time 36 has expired. Time tracking engine 34 may compare the tracked time to the license renewal time 36. When the tracked time reaches, or exceeds, the license renewal time 36, time tracking engine 34 may determine that the license renewal time 36 expired. For example, if the license renewal time 36 is two minutes and time tracking engine 34 determines that the tracked time is one minute, time tracking engine 34 may determine that time remains in the license renewal time 36. Method 300 may proceed to 322 to continue tracking an amount of use of application 10 of a user. If the license renewal time 36 is five minutes and time tracking engine 34 determines that the tracked time is five minutes, time tracking engine 34 may determine that the license renewal time 36 has expired.

At 324, method 300 may include renewing the license and decreasing the rental time by the license renewal time when the license renewal time expires. When time tracking engine 34 determines that the license renewal time expired, time tracking engine 34 may reduce the rental time 26 by the license renewal time 36 and licensing system 30 may be notified to renew license 32 for the remaining rental time 26 to client device 102. For example, licensing system 30 may receive a license renewal request from client device 102 to renew license 32 for the remaining rental time 26. Licensing system 30 may grant a new license 32 for application 10 and send the new license 32 to license manager 29.

For example, if the license renewal time 36 is five minutes, when the tracked use of application 10 reaches five minutes, the rental time 26 may be decreased by five minutes and a new license 32 may be requested. In one or more implementations, the rental time 26 is decreased by five minutes (or other predetermined duration of time) upon distributing the license (e.g., rather than tracking application use in real-time). For instance, licensing system 30 may provide a license associated with a duration of time (e.g., 5 minutes) and decrement rental time 26 by five minutes. Licensing system 30 may then receive a renewal request from client device 102 (e.g., based on the five-minute license 32 expiring), and further decrement rental time 26 by another five minutes upon renewing the license or distributing another license associated with a corresponding renewal time. By constantly renewing license 32 at the license renewal time 36 and decreasing the rental time 26 by the license renewal time 36, licensing system 30 may ensure that the access of application 10 by the user does not exceed the rental time 26.

At 326, method 300 may include determining whether the rental time has expired. For example, time tracking engine 34 may determine whether any rental time 26 remains. When the rental time 26 reaches zero, time tracking engine 34 may determine that the rental time 26 has expired. If the rental time 26 has not expired, method 300 may return to 318.

At 328, method 300 may include terminating the license. If time tracking engine 34 determines that the rental time 26 has expired, licensing system 30 may terminate the license 32. As such, the license 32 may end and the access for application 10 may be terminated. The user may no longer be able to access application 10 without an additional license 32.

At 330, method 300 may optionally include determining whether the rental time is extended. For example, purchasing system 38 may receive purchase information 20 for additional rental time 26 and/or different rental option 18 for application 10 or item(s) 27. Purchasing system 38 may notify licensing system 30 of the additional rental time 26 for license 32.

If the rental time is extended, method 300 may proceed to 312 and may provide the license for the rental time. When a user selects to purchase additional rental time 26, licensing system 30 may renew license 32 and may continue to provide access to application 10 for the rental time 26. Thus, a user may continue to access application 10 for the rental time 26 using license 32. If the user does not extend the rental time 26, method 300 may proceed to 334.

Method 300 may increase user engagement with applications 10. In addition, method 300 may provide increased revenue opportunities for of the applications 10.

Figure 4A:
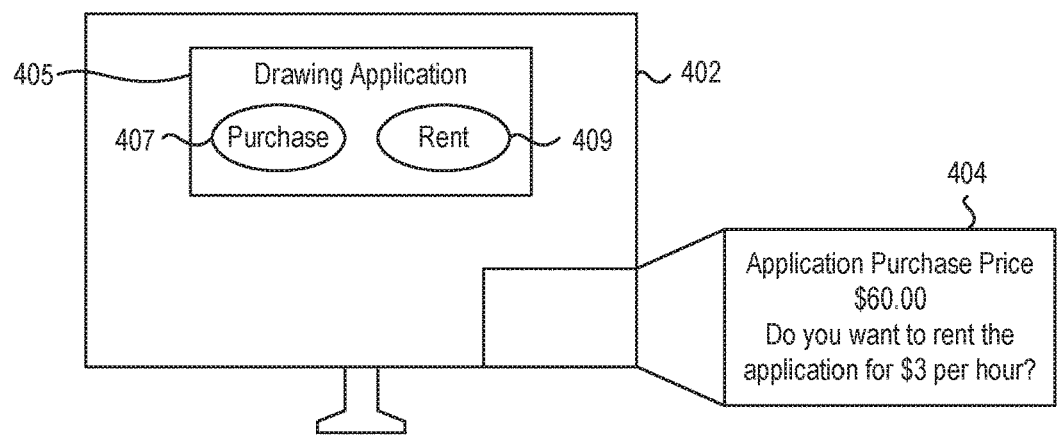
FIGS. 4A and 4B illustrate example user interface screens that display different rental options in accordance with one or more implementations of the present disclosure.
Figure 4B:
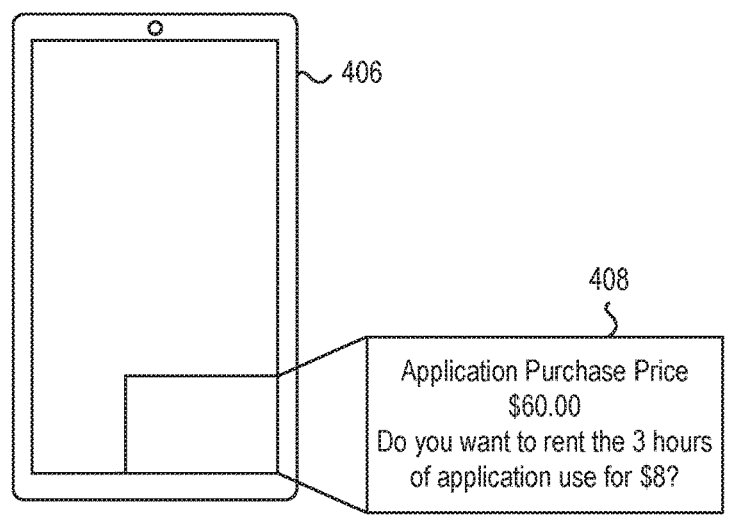
Figure 4C:
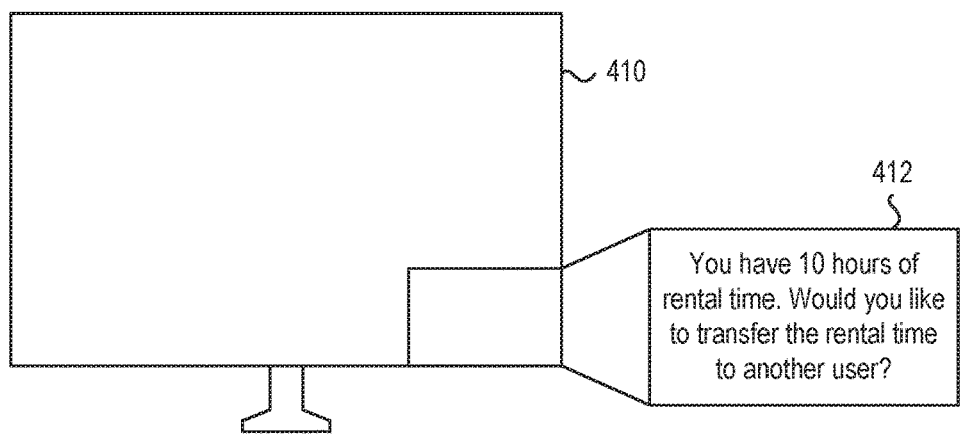
FIG. 4C illustrates an example user interface screen that provides an option to transfer a rental to another user in accordance with one or more implementations of the present disclosure.

Referring to FIGS. 4A-4C, these figures illustrate example notifications delivered via various client devices in accordance with implementations of the present disclosure. FIG. 4A illustrates an example implementation of a client device 402 including a drawing application 405 that a user may choose to purchase 407 or rent 409. A notification 404 may be provided via a graphical user interface of the client device 402. The notification 404 may provide a pay per time period rental option 18 (FIG. 1) for an application 10 (FIG. 1). The notification 404 may be displayed over a portion of the application content and includes a message that reads: "The application purchase price is $60. Do you want to rent the application for $3 per hour?" The notification 404 may also include other offers for sale of the application.

The application store 14 (FIG. 1) may perform any number of actions in response to a detected selection of the rental option 18. For example, the application store 14 may prompt a purchase of the rental option 18 to enable the user to play the application. In addition, the application store 14 may transmit a rental request 16 (FIG. 1) in response to a detected selection of the rental option 18.

FIG. 4B illustrates another example implementation in which a mobile device 406 provides a notification 408 via a graphical user interface of the mobile device 406. The notification 408 may provide an hourly rental option 18 for an application 10. The notification 408 may appear via a banner or other display including a message that reads: "The application purchase price is $60. Do you want to rent 3 hours of application use for $8?" Notification 408 may also include an offer for a sale of one or more available applications.

The application store 14 may perform any number of actions in response to a detected selection of the rental option 18. For example, the application store 14 may prompt a purchase of the rental option 18 to enable the user to play the application. In addition, the application store 14 may transmit a rental request 16 (FIG. 1) in response to a detected selection of the rental option 18.

FIG. 4C illustrates another example implementation including a client device 410 in which the client device 410 provides a notification 412 via a graphical user interface of the client device 410. The notification 412 may provide an option for the user to transfer the rental time for an application to another user. The notification 412 may include a message that reads: "You have 10 hours of rental time. Would you like to transfer the rental time to another user?" The notification 412 may be sent via an email, text message, or other communication displayable via a graphical user interface of the client device 410 to avoid interrupting an application experience of the user provided via the client device 410.

The application store 14 may perform any number of actions in response to a detected selection of transferring the license to another user. For example, the application store 14 may send a transfer request 22 (FIG. 1) to transfer the rental time to another user.

Figure 5:
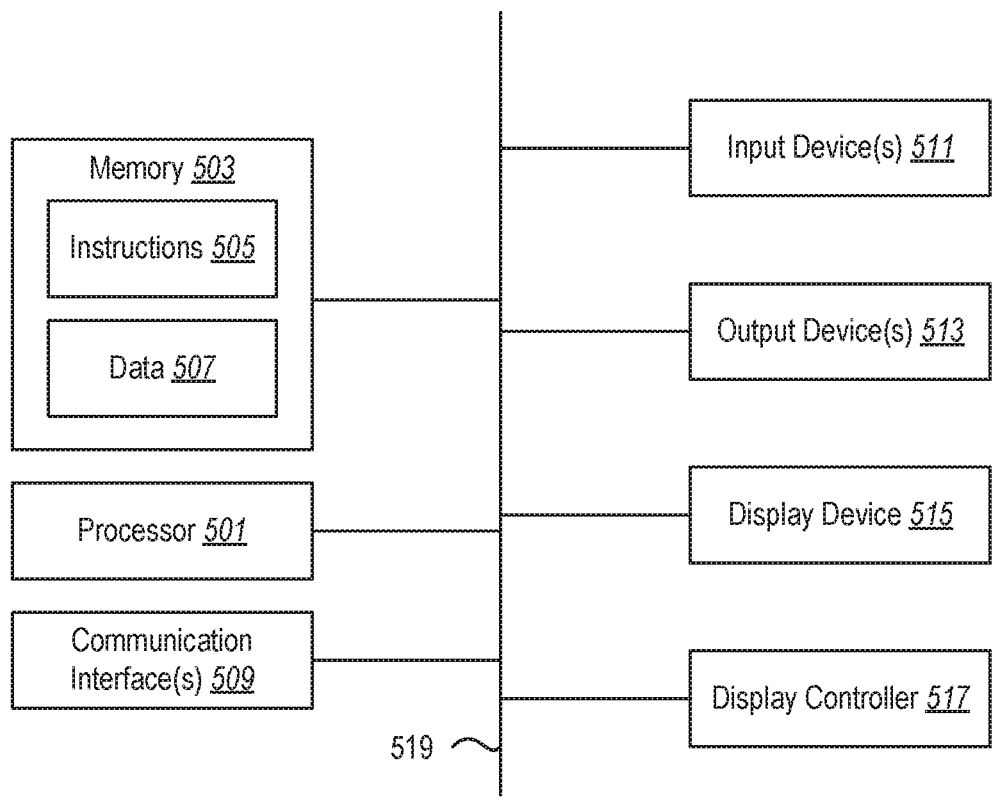
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   determining at least one rental option that includes a rental price for a rental time for an application, wherein the rental price is determined based on a combination of a purchase price for the application and an estimated length of use for the application, wherein the estimated length of use is determined based on a genre of the application and an average use of the application by different users;
   providing a license to a user for providing access to an application for the rental time based on the at least one rental option;
   tracking an amount of use of the application;
   determining whether a license renewal time has expired based on the amount of use; and
   renewing the license in response to the license renewal time expiring and decreasing the rental time by the license renewal time;
   determining whether the rental time has expired; and
   extending or terminating the license based on a determination of whether the rental time expired.

2. The method of claim 1, wherein extending or terminating the license comprises:
   extending the license in response to receiving an indication that the rental time is extended; or
   terminating the license in response to the rental time expiring.

3. The method of claim 1, wherein the license renewal time is a fixed amount of time, and wherein tracking the amount of use comprises incrementing the amount of use by the fixed amount of time when renewing the license.

4. The method of claim 1, wherein tracking the amount of use further includes tracking the amount of use across a plurality of client devices.

5. The method of claim 1, further comprising:
   receiving a transfer request to allow another user to share the rental time; and
   providing the other user an entitlement to the license and the rental time.

6. The method of claim 1, wherein the method further comprises:
   providing a notification that the rental time is about to expire in response to determining an amount of time to complete actions the user is performing in the application exceeds a remaining amount of rental time; and
   providing at least one rental option for extending the rental time.

7. The method of claim 1, wherein the at least one rental option is one or more of a burndown rental or a pay by a time rental.

8. The method of claim 7, wherein the rental price is determining using one or more of a history of the user, subscriptions owned by the user, or promotions by an application publisher.

9. The method of claim 1, wherein the application is a digital game, and the estimated length of use is determined based on a gaming history of the user.

10. The method of claim 1, further comprising:
    providing at least one option to extend the rental time in response to a determination that the rental time expired, wherein the at least one option includes purchasing the application by applying a rental price for the rental time to purchase price of the application; and
    extending the license in response to receiving an indication that the rental time is extended.

11. The method of claim 1, further comprising:
    providing at least one option to extend the rental time in response to a determination that the rental time expired, wherein the at least one option includes selecting a different rental option for the application; and extending the license in response to receiving an indication that the rental time is extended.

12. A server, comprising:
a memory to store data and instructions;
at least one processor configured to communicate with the memory, wherein the processor is operable to:
   determine at least one rental option that includes a rental price for a rental time for an application, wherein the rental price is determined based on a combination of a purchase price for the application and an estimated length of use for the application, wherein the estimated length of use is determined based on a genre of the application and an average use of the application by different users;
   provide a license to a user for accessing an application during the rental time based on the at least one rental option;
   track an amount of use of the application;
   determine whether a license renewal time has expired based on the amount of use;
   renew the license in response to the license renewal time expiring and decreasing the rental time by the license renewal time;
   determine that the rental time has expired; and
   extend or terminate the license based on a determining of whether the rental time expired.

13. The server of claim 12, wherein the processor is further operable to:
   extend the license in response to receiving an indication that the rental time is extended; or
   terminate the license in response to the rental time expiring.

14. The server of claim 12, wherein the license renewal time is a fixed amount of time, and wherein tracking the amount of use comprises incrementing the amount of use by the fixed amount of time when renewing the license.

15. The server of claim 12, wherein the processor is further operable to track the amount of use across a plurality of client devices.

16. The server of claim 12, wherein in the processor is further operable to:
   receive a transfer request to allow another user to share the rental time; and
   providing the other user an entitlement to the license and the rental time.

17. The server of claim 12, wherein the processor is further operable to:
   provide a notification that the rental time is about to expire in response to determining an amount of time to complete actions the user is performing in the application exceeds a remaining amount of rental time; and
   provide at least one rental option for extending the rental time.

18. The server of claim 12, wherein the at least one rental option is one or more of a burndown rental or a pay by a time rental.

19. The server of claim 12, wherein the processor is further operable to determine the rental price using one or more of a history of the user, subscriptions owned by the user, or promotions by an application publisher.

20. A non-transitory computer-readable medium storing instructions executable by a computer device, comprising:
   at least one instruction for causing the computer device to determine at least one rental option that includes a rental price for a rental time for an application, wherein the rental price is determined based on a combination of a purchase price for the application and an estimated length of use for the application, wherein the estimated length of use is determined based on a genre of the application and an average use of the application by different users;
   at least one instruction for causing the computer device to provide a license to a user to access an application during the rental time based on the at least one rental option;
   at least one instruction for causing the computer device to track an amount of use of the application that indicates a total amount of time for accessing the application;
   at least one instruction for causing the computer device to use the amount of use of the application to determine whether a license renewal time has expired;
   at least one instruction for causing the computer device to renew the license in response to the license renewal time expiring and decreasing the rental time by the license renewal time;
   at least one instruction for causing the computer device to determine whether the rental time is expired; and
   at least one instruction for causing the computer device to extend or terminate the license in response to a determination of whether the rental expired.

* * * * *